(12) United States Patent  
Humphrey et al.

(10) Patent No.: US 8,495,120 B2  
(45) Date of Patent: Jul. 23, 2013

(54) METHOD FOR USING A GRAPHICS PROCESSING UNIT FOR ACCELERATED ITERATIVE AND DIRECT SOLUTIONS TO SYSTEMS OF LINEAR EQUATIONS

(75) Inventors: John R. Humphrey, Wilmington, DE (US); Daniel Price, Newark, DE (US); Eric Kelmelis, New London, PA (US)

(73) Assignee: EM Photonics, Inc., Newark, DE (US)

( * ) Notice: Subject to any disclaimer, the term of this patent is extended or adjusted under 35 U.S.C. 154(b) by 415 days.

(21) Appl. No.: 12/816,334

(22) Filed: Jun. 15, 2010

(65) Prior Publication Data

US 2010/0318593 A1   Dec. 16, 2010

Related U.S. Application Data

(60) Provisional application No. 61/187,091, filed on Jun. 15, 2009.

(51) Int. Cl.  
*G06F 17/12* (2006.01)

(52) U.S. Cl.  
USPC ............................................. 708/446

(58) Field of Classification Search  
None  
See application file for complete search history.

(56) References Cited

U.S. PATENT DOCUMENTS

| | | | |
|---|---|---|---|
| 7,483,937 B2 * | 1/2009 | Nakanishi | 708/607 |
| 8,260,600 B1 * | 9/2012 | Deng et al. | 703/14 |
| 2010/0217577 A1 * | 8/2010 | Korobkov et al. | 703/18 |
| 2010/0306736 A1 * | 12/2010 | Bordelon et al. | 717/109 |
| 2010/0318593 A1 * | 12/2010 | Humphrey et al. | 708/446 |

* cited by examiner

*Primary Examiner* — David H Malzahn  
(74) *Attorney, Agent, or Firm* — Novak Druce Connolly Bove + Quigg LLP

(57) ABSTRACT

Methods for increasing the processing speed of computational electromagnetic methods, such as the Method of Moments (MoM), may involve using efficient mapping of algorithms onto a Graphics Processing Unit (GPU) architecture. Various methods may provide speed/complexity improvements to either or both of: (1) direct solution via Lower-Upper (LU) factorization; and (2) iterative methods (e.g., Generalized Minimal Residual (GMRES) method).

37 Claims, 13 Drawing Sheets

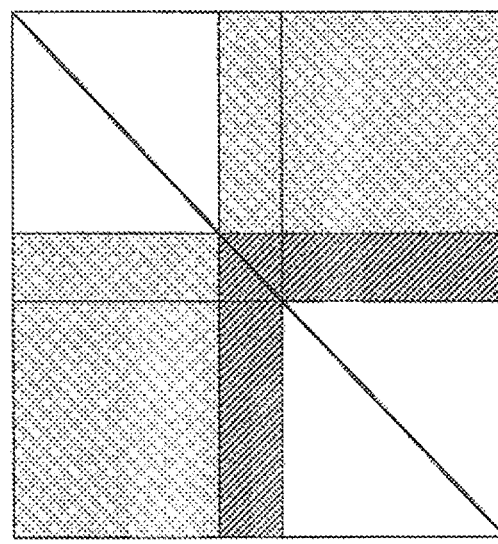
Figure 1A - Crout formulation access pattern.

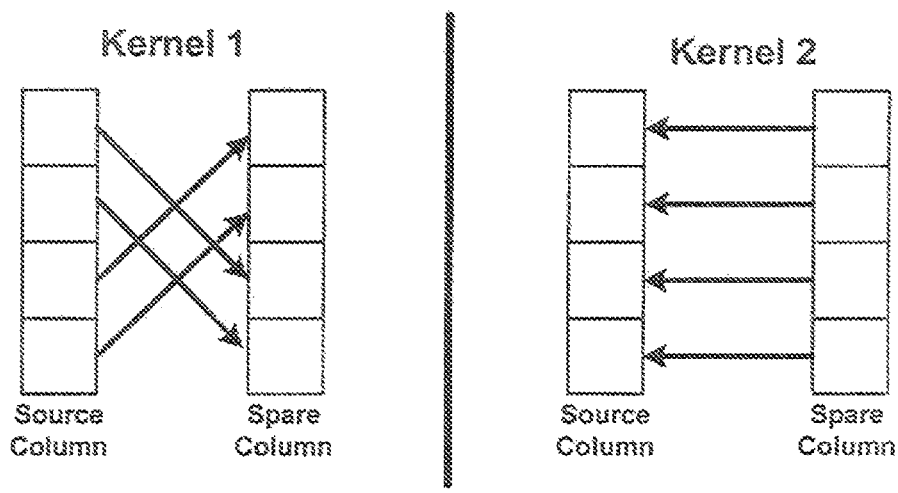
Figure 2A - Row interchanges with a spare column
The first kernel reads from the pivot array in a scattered manner; the second writes back sequentially to the original matrix

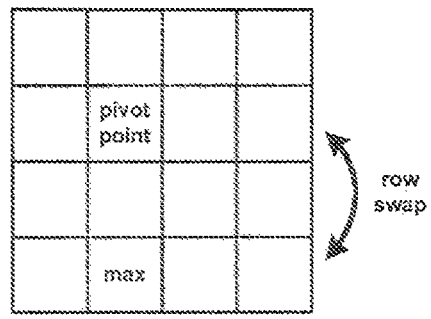
Figure 3A – Pivoting
*The largest element is selected, and its row swapped with the current row*

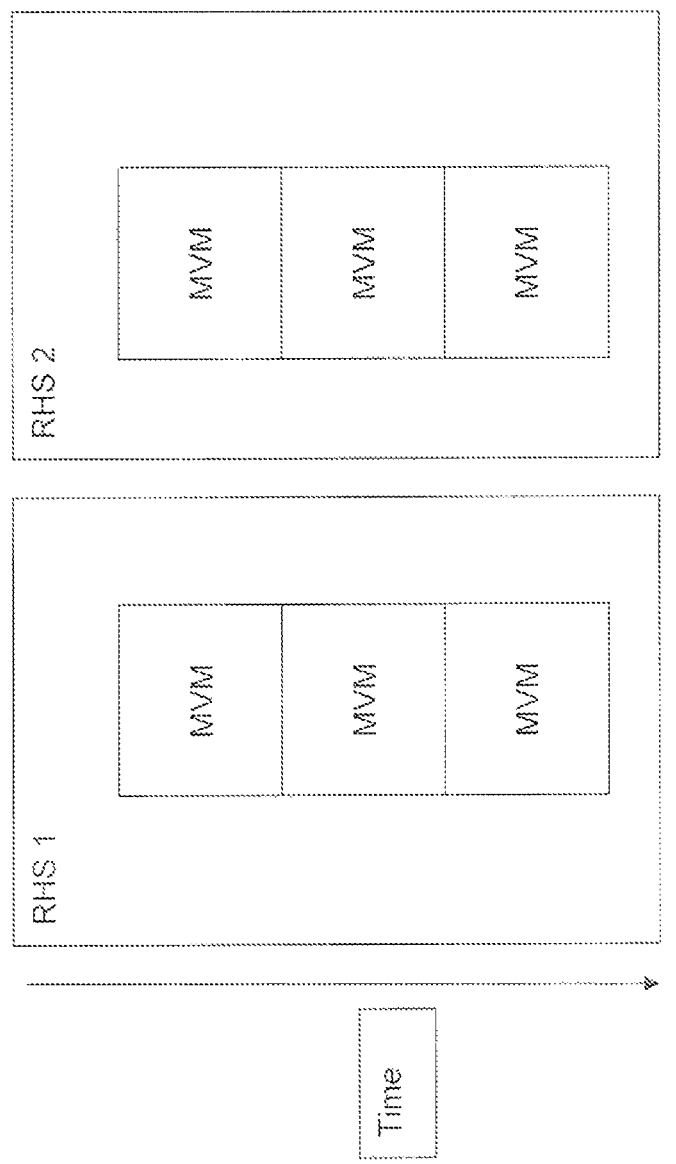

METHOD FOR USING A GRAPHICS PROCESSING UNIT FOR ACCELERATED ITERATIVE AND DIRECT SOLUTIONS TO SYSTEMS OF LINEAR EQUATIONS

CROSS-REFERENCE TO RELATED APPLICATION

This application is a non-provisional application claiming priority to U.S. Provisional Patent Application No. 61/187,091, filed on Jun. 15, 2009, and incorporated herein by reference in its entirety.

FIELD OF THE INVENTION

This invention relates generally to accelerating problem solving methods and various embodiments of the invention may pertain, more specifically, to computer analysis with the Method of Moments (MoM).

BACKGROUND OF THE INVENTION

The Method of Moments (MoM) is a popular frequency domain technique used in computational electromagnetics and is also used to solve a wide range of problems, from circuit simulation to radar signatures of airplanes and ships. The method employs models of the boundaries where discrete objects touch. In particular, these boundaries are discretized into a plurality of patches, then an excitation is applied, and then the currents/charges on the patches are obtained. From these currents/charges obtained from the patches, many useful quantities can be calculated. These useful quantities include, but are not limited to: scattering patterns, capacitance, and inductance and radar cross sections.

When one has N patches, there are $N^2$ interactions that take place among the N patch elements. As a result, a matrix of size N×N can be obtained for this situation. The N×N matrix represents a system of linear equations, such as A*x=b, where: A is the N×N matrix; b represents the excitation, and x represents a matrix of the values of the current/charge on the various patches. The N×N matrix represents a system of linear equations that is typically quite dense in nature. A dense system of equations may consist of hundreds to many thousands of unknowns in real and/or complex form.

The preferred solvers for the MoM are: (1) direct solution via Lower-Upper (LU) factorization, followed by (2) iterative methods (e.g., Generalized Minimal Residual (GMRES) method). However, a bottleneck may exist in using these preferred solvers in attempting to solve the dense system of linear equations discussed above in that these solvers, as implemented in prior implementations, may generally become impractical as the problem size grows. That is, though they provide more accurate answers, the LU and GMRES methods are often overlooked for all but the most trivial problems. As an alternative, the so-called "accelerated methods," which generally sacrifice accuracy and applicability for speed, are used instead.

However, a limitation of these accelerated methods is that they are less accurate, and they are, therefore, typically used only as a last resort. Thus, in the background art, LU and iterative solvers such as GMRES are preferred for small to medium sized problems, and accelerated methods are preferred for very large problems. Therefore, in consideration of the above discussion, there is a need in the art for solvers for the MoM that are fast, accurate and can be applied to larger problems.

SUMMARY OF VARIOUS EMBODIMENTS OF THE INVENTION

Embodiments of the invention may be used to provide accelerated methods for solving the LU and/or GMRES methods that may enable their use beyond just small and medium sized problems. That is, embodiments of the invention may provide accelerated methods for solving large-sized problems that cannot now use LU and GMRES. In addition, embodiments of the invention may be implemented on, but are not limited to use on, a Graphics Processing Unit (GPU) platform.

In particular, various embodiments of the invention may make use of the "Crout" variant for supercomputers, as applied to the GPU, and a combination of GPU techniques. A formulation of the GMRES solver, tuned for electromagnetics convergence, may be used, but the bulk of work of this solver may be implemented by the GPU.

Embodiments of the invention that implement the LU and GMRES solvers on the GPU may be significantly faster than background art software implementations. In this way, embodiments of the invention may expand the range of problems for which these solvers are applicable and create new possibilities for the use of these algorithms.

Various embodiments of the invention may be implemented in hardware, software, and/or firmware. Software implementations may include machine-executable instructions embodied on a computer-readable storage medium, such as a ROM, RAM, or other type of memory device, which upon execution by one or more computing devices, cause the execution of various operations according to embodiments of the invention. A computing device, such as one or more computers or processors, may be configured to implement various embodiments of the invention. Further more, software, such as the machine-executable instructions described above, may be downloaded over a communication medium or may be made available for download over a communication medium, to thereby permit a remote computing device to obtain and/or execute the software.

BRIEF DESCRIPTION OF THE DRAWINGS

Embodiments of the invention can be described in greater detail with the aid of the following drawings.

FIG. 1A shows an exemplary embodiment of the Crout formulation access pattern for the thread specialization algorithm;

FIG. 2A shows an exemplary embodiments of invention for the Block permute algorithm;

FIG. 3A shows an exemplary embodiment of the pivoting algorithm of embodiments of the invention;

FIGS. 5A-5F show various system/process architectures for various embodiments of the invention.

DETAILED DESCRIPTION OF VARIOUS EMBODIMENTS

Figure 1B:
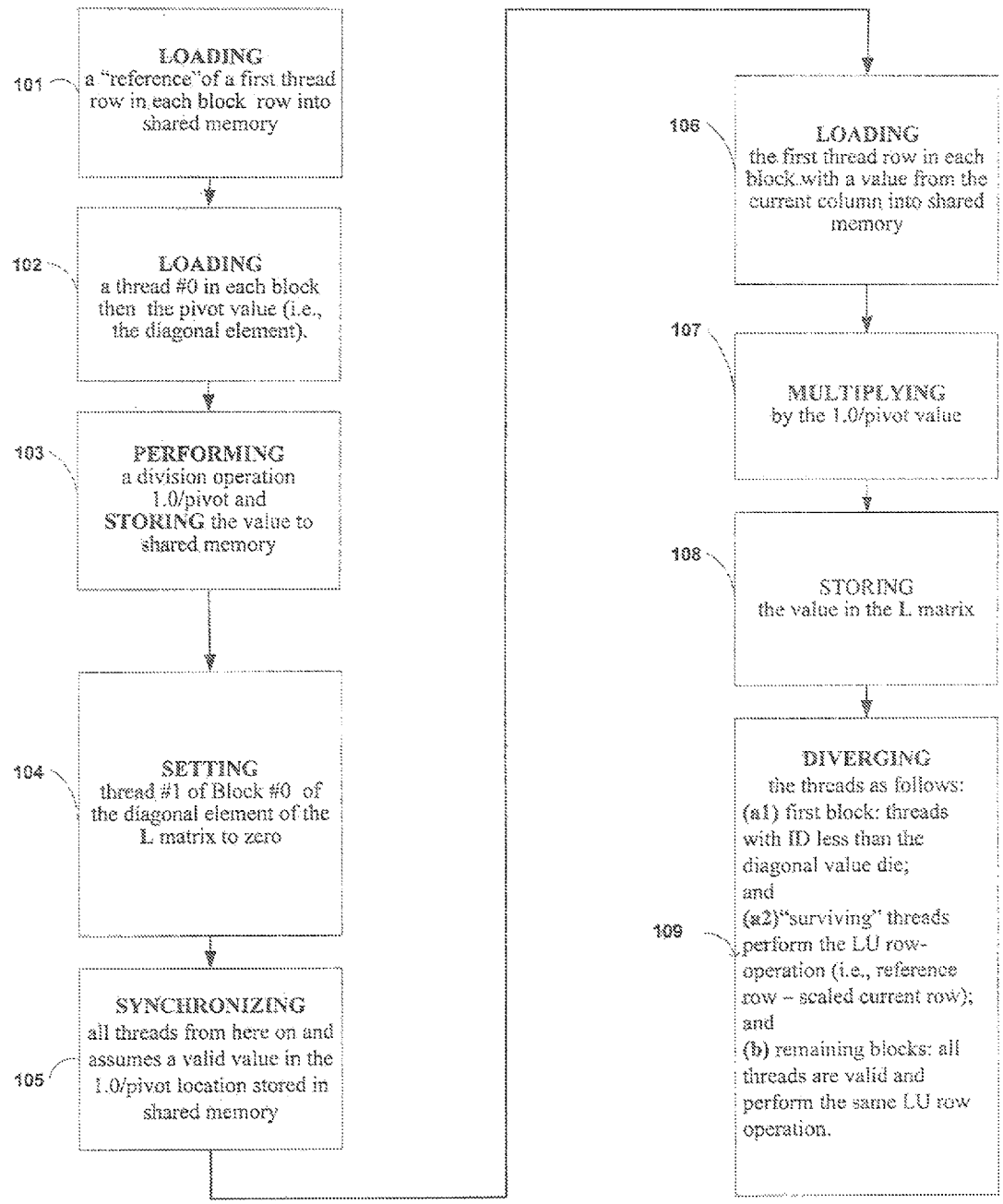
FIG. 1B shows an exemplary embodiment of a flow diagram of the thread specialization algorithm.

Embodiments of the invention may result in a package of accelerated solvers for the preferred methods for solving electromagnetic systems: LU and GMRES. Embodiments of the invention may utilize a Graphics Processing Unit (GPU) in implementing these methods.

GPUs are very efficient at manipulating and displaying computer graphics and have a highly parallel structure that makes them more effective than general-purpose central processing units (CPUs) for a wide range of complex algorithms. Typically, a GPU may be a single-chip processor that may be used to create lighting effects and/or to transform objects whenever a three-dimensional (3D) scene is drawn. GPU manufacturers include, but are not limited to: Advanced Micro Devices (AMD) and NVIDIA.

In embodiments of the invention, the use of the highly parallel structure of a GPU in solving electromagnetic system problems may result in decreased processing times compared to what is possible with a general-purpose CPU. As a result, by using embodiments of the invention, the LU and GMRES methods can be employed for a wider range of problem sizes before these methods become impractical due to processing time/complexity limitations.

Our GPU programming platform of choice is NVIDIA Corporation's CUDA product. CUDA stands for Compute Unified Device Architecture and is a compiler/language pair which presents a C-style interface to the GPU. This allows for a programmer to directly express parallel programming concepts on the GPU. While the CUDA system is our platform of choice, any hardware-oriented programming language could be used with embodiments of the invention, including but not limited to: OpenCL and ATI's Close to the Metal (CTM.)

As discussed above, the currently preferred method for solving any system of equations is the LU Decomposition algorithm. The reasons for preferring this method are twofold:
 (1) the solution is very stable and is the most accurate solution available when using the limited-precision arithmetic; and
 (2) solutions to subsequent equations with different "right-hand-sides" are available for a much smaller $O(N^2)$ cost in time/complexity.

The LU Decomposition may use techniques similar to Gaussian elimination in order to produce an L matrix (i.e., Lower triangular matrix) and a U matrix (i.e., Upper triangular matrix). However, due to the time/complexity required to produce the initial LU decomposition, which is $O(N^3)$, background art applications of this algorithm are limited to only small-to-moderately sized matrices.

In general, an LU decomposition of a square matrix A, which again may represent a matrix of interactions among patches of system modeled using MoM, takes the form of Equation (1) below where:

$$A = \begin{bmatrix} a_{11} a_{12} a_{13} \\ a_{21} a_{22} a_{23} \\ a_{31} a_{32} a_{33} \end{bmatrix} = LU = \begin{bmatrix} l_{11} \\ l_{21} l_{22} \\ l_{31} l_{32} l_{33} \end{bmatrix} \begin{bmatrix} u_{11} u_{12} u_{13} \\ u_{22} u_{23} \\ u_{33} \end{bmatrix}, \quad (1)$$

where L and U are lower and upper triangular matrices (of the same size as matrix A), respectively. This means that L has only zeros above the diagonal and U has only zeros below the diagonal.

In addition, variations of the LU Decomposition algorithm have been formulated for parallel computing on "blocked" processing configurations. That is, portions of the algorithm (i.e., the matrices/vectors) have been partitioned into "blocks" that can be spread across a plurality of computational elements in a parallel computer (e.g., GPU), so the computations can be done on each partition/block in parallel by different ones of the plurality of computational elements in order to speed up the algorithm.

For a blocked processing LU Decomposition, three different variants exist based on the order-of-operations. Each of these variants has different strengths and weaknesses in a parallel computing environment. The three variants are known as: Right-Looking, Left-Looking, and Crout. The advantages and disadvantages of these three variants will be discussed in the following sections.

The Right-Looking variant of LU Decomposition has the advantage that it is the most conceptually straightforward from the base LU algorithm of Equation (1). This algorithm proceeds along the diagonal of the matrix and reads/writes data only below and to the right of the diagonal. However, a disadvantage of this algorithm is that it may relatively perform poorly for parallel computing because the amount of overall work decreases linearly as progress is made along the diagonal.

The Left-Looking variant reads to the left of the diagonal block and only updates within the current block of the source column. The advantage of this variant is that this is a favorable data access pattern, and the workload remains more or less constant through time. However, the disadvantages of this variant of the algorithm are two-fold:
 (1) serial solutions to a block-sized triangular system are often required, which slightly limits the overall parallelism; and
 (2) the amount of pivoting required may become excessive (i.e., since no writes occur to the right of the block diagonal, pivoting must be applied later.)

The Crout variant seeks to overcome some of the limitations of the two variants discussed above by only performing:
 (a) reads to the left; and
 (b) writes to the current block column and to the right of that column.

The disadvantage of the Crout variant is that more processing bandwidth may be required overall. However, this "disadvantage" can be turned into an advantage if sufficient processing bandwidth is available. That is, the arithmetic intensity of the Crout variant is much more concentrated in the matrix-vector-matrix multiply (MVM) portions. Thus, this characteristic tends to lead to the highest speed implementations of the LU Decomposition with a processor architecture that is well matched to solution of MVM computations (e.g., a GPU).

In the case of the Crout algorithm, the upper triangular matrix U of Equation (1) is instead formed as a unit upper triangular matrix U', and is shown in Equation (2) below:

$$A = \begin{bmatrix} a_{11} a_{12} a_{13} \\ a_{21} a_{22} a_{23} \\ a_{31} a_{32} a_{33} \end{bmatrix} = L'U' = \begin{bmatrix} l'_{11} \\ l'_{21} l'_{22} \\ l'_{31} l'_{32} l'_{33} \end{bmatrix} \begin{bmatrix} 1 & u_{12} & u_{13} \\ & 1 & u_{23} \\ & & 1 \end{bmatrix}. \quad (2)$$

The Crout formulation allows for a "packed" representation of the data, discarding all unnecessary zero and unit entries and only preserving the l and u terms. This is represented as:

$$A = \begin{bmatrix} a_{11} a_{12} a_{13} \\ a_{21} a_{22} a_{23} \\ a_{31} a_{32} a_{33} \end{bmatrix} = L'U' = \begin{bmatrix} l'_{11} u_{12} u_{13} \\ l'_{21} l'_{22} u_{23} \\ l'_{31} l'_{32} l'_{33} \end{bmatrix}.$$

Accordingly, this representation saves half of the memory of other implementations. In consideration of these features, embodiments of the invention may typically implement the Crout formulation, although embodiments of the invention are not thus limited, and, for example, the left-looking formulation is also possible if the need arises.

In addition, an LUP Decomposition (i.e., an LU decomposition with partial pivoting) is a decomposition of the form of Equation (3):

$$A = \begin{bmatrix} a_{11} a_{12} a_{13} \\ a_{21} a_{22} a_{23} \\ a_{31} a_{32} a_{33} \end{bmatrix} = L'U'P = \begin{bmatrix} l'_{11} u_{12} u_{13} \\ l'_{21} l'_{22} u_{23} \\ l'_{31} l'_{32} l'_{33} \end{bmatrix} \begin{bmatrix} 100 \\ 010 \\ 001 \end{bmatrix}, \quad (3)$$

where L and U are again lower and upper triangular matrices and P is a permutation matrix (i.e., a matrix of zeros and ones that has exactly one entry 1 in each row and column; this may be, for example, an identity matrix, as shown in Equation (3), but it is not thus limited). In addition, full pivoting could be added if desired.

Further, all pivoted formulations of embodiments of the LU Decomposition may require one or more of the following operations:
Computing matrix products;
Performing LU decompositions of tall rectangular blocks that further includes:
Performing standard LU row operations;
Scanning for the largest element in a column; and
Row interchange;
Permuting a vector;
Permuting a matrix region;
Backsolving (i.e., when using the LU decomposition to solve systems of equations, as is the case in embodiments of the invention).
In embodiments of the invention, each of the operations discussed above may be implemented on the GPU platform.

The following sections discuss the details of embodiments of invention for the LU Decomposition of the diagonal and sub-diagonal blocks, as shown in FIG. 1A. A major portion of the blocked LU decomposition may comprise performing the LU factorization of the block on the diagonal plus all blocks below the diagonal. A method according to various embodiments of the invention for this operation may use "thread specialization." That is, rather than launch a series of micro-kernels, embodiments of the invention may instead allow threads to perform divergent tasks by determining the thread specialization from a thread ID, as discussed below. In this discussion, "thread ID" refers to a thread's association with the matrix/blocks of the matrix; for example, a thread having a thread ID "less than the diagonal value" (of the matrix/block) is associated with a position below and/or to the left of the diagonal.

In particular, an embodiment of the Crout formulation access pattern for the thread specialization algorithm is shown in FIG. 1A. FIG. 1B illustrates an exemplary embodiment of a flow diagram of the thread specialization algorithm. In FIG. 1B, a first thread row in each block may load up a "reference" row (i.e., the row on the diagonal) into shared memory 101; a "thread row" is a subset of threads created for performing various tasks. A thread #0 in each block may then load the pivot value (i.e., the diagonal element) 102. Performing the division operation, 1.0/pivot (i.e., obtaining the reciprocal of the pivot value), and storing this value to shared memory may occur at block 103. Simultaneously, thread #1 of Block #0 may set the diagonal element of the L matrix to zero 104. In block 105, the system may synchronize all threads from this point on and assumes a valid value in the 1.0/pivot location stored in shared memory. Then, the first thread row in each block may load a value from the current column into shared memory 106 and may then multiply it by the 1.0/pivot value 107. The value may then be stored in the L matrix 108. This may be followed by the threads diverging as follows:

(a1) first block: threads with ID less than the diagonal value die; and
(a2) "surviving" threads perform the LU row-operation (i.e., reference row-scaled current row); and
(b) remaining blocks: all threads are valid and perform the same LU row operation.

Figure 2B:
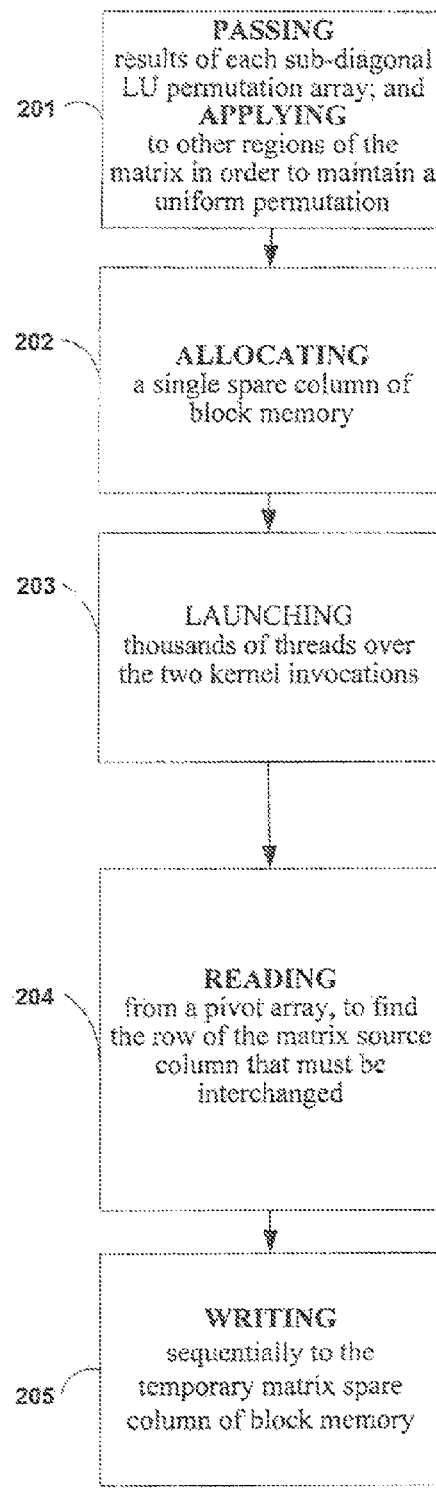
FIG. 2B shows an exemplary embodiments of the flow diagram for the Block permute algorithm.

The following section discusses the details of embodiments of invention for the block permute algorithm, as illustrated in FIG. 2A and shown in flow diagram form in FIG. 2B. In 201 of FIG. 2B, each sub-diagonal LU may pass on results in a permutation array that must be applied to other regions of the matrix in order to maintain a uniform permutation. To do this, as shown in FIG. 2A, embodiments of the invention may allocate a single spare column of block memory. This is indicated in 202 of FIG. 2B. Then, embodiments of the invention may launch a plurality of threads (which may be in the thousands, as indicated in 203 of FIG. 2B) over the two kernel invocations, as shown in FIG. 2A.

Further, as shown in FIG. 2A, the first kernel may read from a pivot array to find the row of the matrix source column that must be interchanged, as indicated by 204 of FIG. 2B. This data may then be written sequentially to the temporary matrix spare column of block memory, as indicated by 205 in FIG. 2B.

Furthermore, as illustrated in FIG. 2A, this write step cannot be directly within the same row because:
(1) there may be no guarantee, e.g., in CUDA, of execution order; and
(2) there needs to be a guarantee that every matrix data element is read before being overwritten, which could happen in 205.
As shown in FIG. 2A, the data of the matrix space column in the second micro-kernel may simply be copied back into the matrix source column of the original matrix source column in a 1-to-1 manner. This optimization of the permutation algorithm may result in significant overall simulation/computation time (e.g., in our smallest sized test problem, the simulation/computation time was reduced by 53%, relative to a non-optimized algorithm).

This section discusses the details of embodiments of invention for the pivoting algorithm. Pivoting may be an important technique when performing LU decomposition in a limited precision environment, such as with floating-point arithmetic on a computer. The need may arise from the division operations used when scaling a row and computing the pivot. With limited precision arithmetic, dividing 1.0 by a small number can lead to significant numerical error. When this operation is performed on thousands of rows in a matrix, the error can accumulate to the point that the resulting decomposed matrix is highly inaccurate. The pivoting algorithm of embodiments of the invention may reduce this effect by scanning each column for the largest magnitude value and then swapping the current row with that row, as shown in FIG. 3A. The division operation may then proceeds on the largest possible value, which may then result in improved accuracy.

Figure 3B:
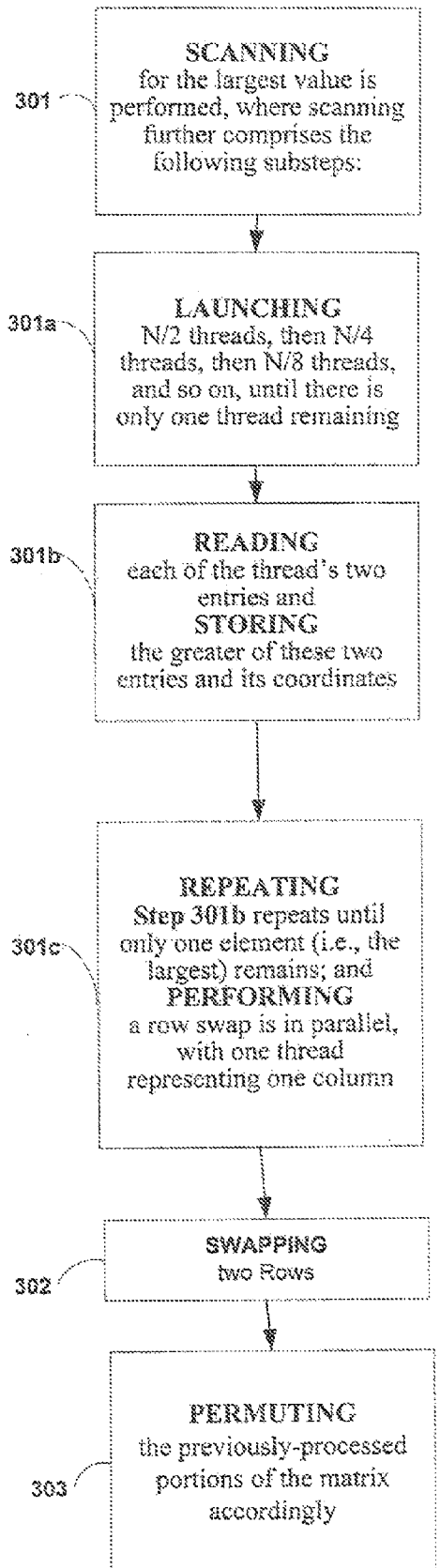
FIG. 3B shows an exemplary embodiment of the flow diagram of the pivoting algorithm of embodiments of the invention.

The pivoting algorithm of embodiments of the invention is illustrated in FIG. 3A and may be as shown in the flow diagram FIG. 3B. In 301, scanning for the largest value may be performed. Swapping two rows may occur at 302. Permuting the previously-processed portions of the matrix accordingly may then be performed 303.

Embodiments of the invention may be directed at overcoming the limitations of the background art, for the "scanning" of 301. That is, it has been particularly difficult to perform scanning in parallel processing environment. Embodiments of the invention may overcome this difficulty by implementing a recursive scanning scheme that may launches N/2 threads, then N/4 threads, then N/8 threads, and so on, until there is only one thread remaining as shown at 301*a* (i.e., part of 301) in FIG. 3B. Each of the threads may read two entries and may store the greater of these two entries and its coordinates in 301*b*. 301*b* may be repeated until only one element (i.e., the largest) remains. Further, in 301*c*, a row swap may be performed in parallel, with one thread representing one column.

This section discusses the details of the iterative methods of embodiments of the invention. As discussed above, when the problem size grows beyond small or intermediate, in terms of number of unknowns, the $O(N^3)$ time/complexity of the LU Decomposition can become a practical limitation of background art approaches. That is, the LU Decomposition solution may no longer be viable. To overcome these limitations of the background art LU Decomposition algorithms, embodiments of the invention may use iterative methods, which may produce successively "better" solution vectors within the Krylov subspace, iterating on these until a solution vector is obtained that is within a predetermined tolerance that may be user-defined based on the particular problem. The advantages of such an approach are that the solution time may be decreased to $O(N^2)$, which, to an extent, can overcome the time/complexity limitations. Typically, one may use LU Decomposition whenever possible and move into iterative solutions, such as GMRES, when absolutely necessary. Thus, it may be highly desirable to have both methods available in many circumstances.

When parallelizing an iterative solver, there is typically a matrix-vector product required, and this product may constitute the overwhelming majority of computation time/complexity. Thus, the main acceleration of embodiments of the invention focuses on such a solver in the matrix-vector routine.

Figure 4:
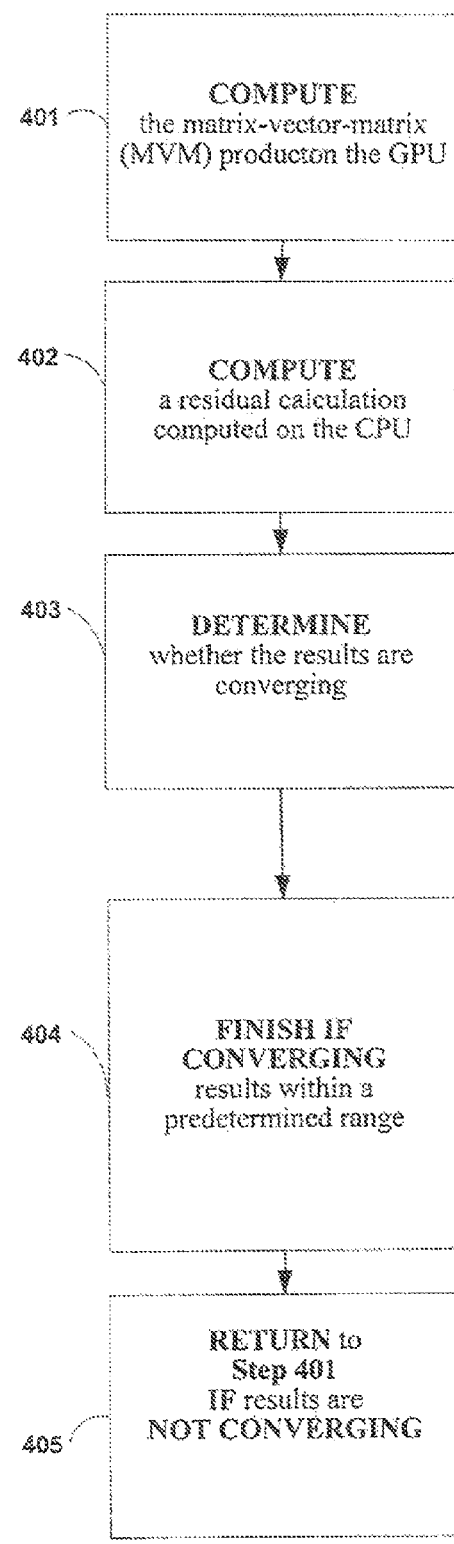
FIG. 4 is an exemplary flow diagram of the method of the iterative solver.
Figure 5A:
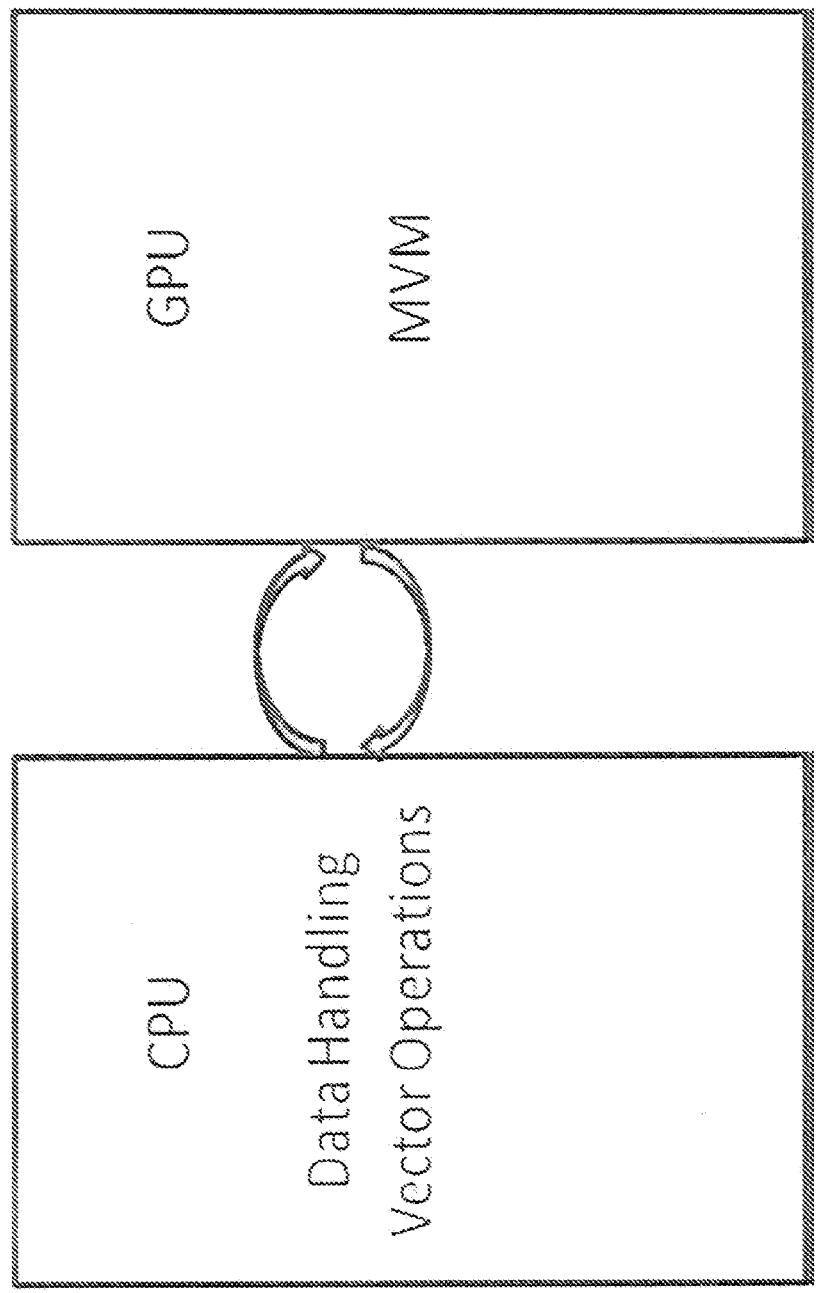

FIG. 4 is an exemplary flow diagram of the method of the iterative solver according to various embodiments of the invention. As shown in FIG. 5A, such an interative solver may utilize one or more central processing units (CPUs), in addition to one or more GPUs. In particular, the matrix-vector-matrix (MVM) product may calculated on a GPU 401. In addition, a residual calculation for a GMRES may solve A*x=b by iteratively refining its "guess" for x until A*x is sufficiently close to equal to h (as may be defined by the user's tolerance, e.g., as discussed above). The residual is merely the difference between the most recent A*x and the b. This may be computed, e.g., on a central processing unit (CPU) 402. As expected, the MVM operations of 401 may typically take up the majority of the time/complexity. However, during experimentation, it was determined that the bandwidth of communicating a vector to/from the GPU for each iteration was sufficiently small to not be a bottleneck.

Multiboard/Hybridization of GMRES is discussed in the following. There are many circumstances in science where performing a linear system solution with a fixed matrix (A) but many different Right Hand Sides (RHSs; b) may be desirable. Examples include Radar Cross Section calculation and the capacitance analysis of electronic chip packages. The most obvious approach is to solve them serially; i.e., to repeat the GMRES analysis for each of the RHS vectors. This will scale linearly in time. However, an observation can be made: on a parallel platform, the matrix-vector product at the heart of the GMRES process is an inefficient operation because it is a reduction operation (the disadvantages of this were discussed previously.) By solving many or all of the candidate RHSs simultaneously, the matrix-vector products can be converted to matrix-matrix products, which are very efficient on the GPU. Thus, a superlinear speedup may be expected.

Figure 5B:
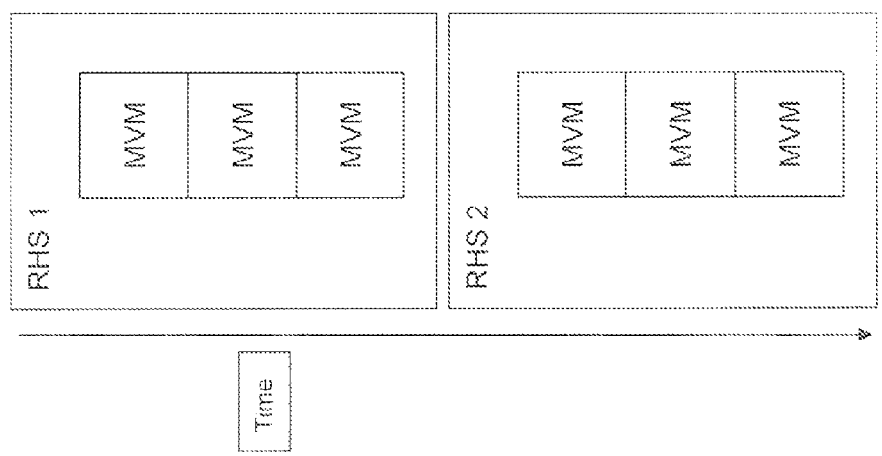

The standard solution process (serial) may be illustrated by the diagram of FIG. 5B. That is, for each RHS, the system may be solved separately.

Figure 5C:
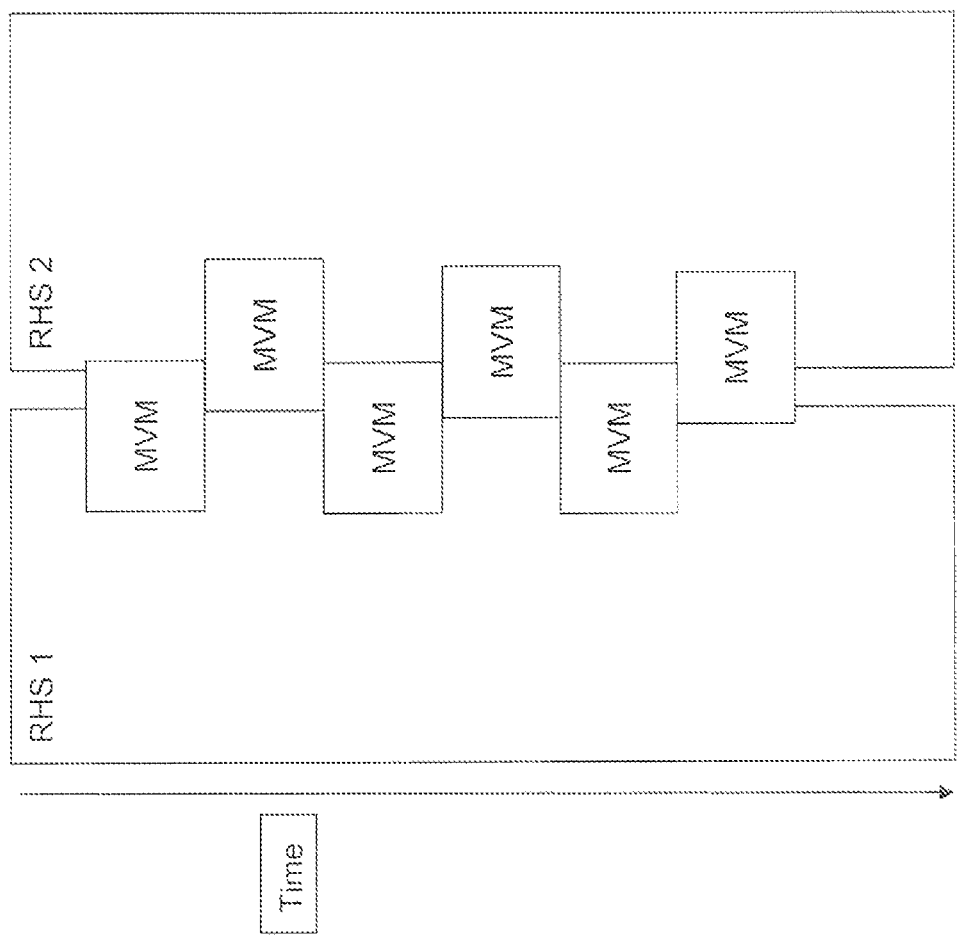

This process may be converted to the process, e.g., as shown in FIG. 5C, which may represent a GMRES solution process with, e.g., one GPU matrix-vector core and multiple solver cores. In particular, one may begin by parallelizing the solver cores and keep the MVM core intact. The solver cores may be fully independent except for the need to access the MVM core. This interaction may be performed with a simple mutex lock. Such a scheme may result in no need to worry about load balancing since the GMRES process involves work→MVM→work→MVM, etc. Thus, it may automatically load-balance.

However, the scheme shown in FIG. 5C may be further improved, e.g., to exploit multi-GPU parallelism and to permit further scaling. Thus, the system may be further modified to include multiple GPUs, as shown in FIG. 5D. This version may use multiple CPUs and multiple GPUs simultaneously, e.g., with one GPU bound to each CPU specifically, e.g., in the manner of FIG. 5A.

However, this design, as with the ones before it, may not always scale well. The scheme of FIG. 5D may use one CPU and one GPU bound together to produce results and each pair may, therefore, need to solve its RHS to fruition before moving onwards to further processing. Thus any RHS beyond min(cpu_count, gpu_count) must wait for processing until a GPU/CPU pair is free and has completed its current workload. This suggests that further improvement may be obtained by decoupling the two and using a scheme as shown in FIG. 5E.

Figure 5E:
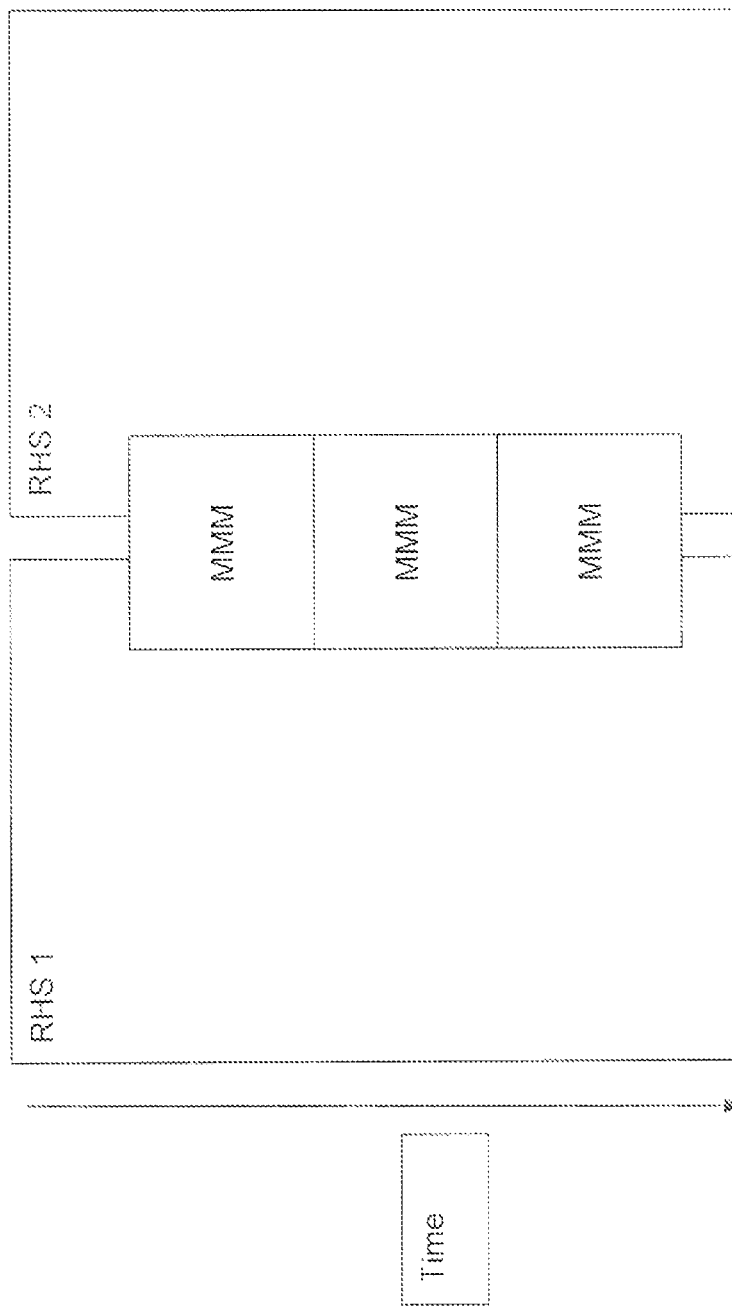

The scheme of FIG. 5E shows a GMRES solver using one GPU matrix-matrix multiplication core and multiple solver cores; this may be scaled to permit further GPU cores, as well. The matrix-matrix multiply (MMM) may produces a better FLOPS speed from a given amount of bandwidth. Thus, FIG. 5E may include multiple cores working at once and providing data to a single GPU. As can be seen in FIG. 5E, the solution to the problem with one GPU using this method may be performed at roughly the same speed as the fused GPU/CPU pairs above. This version also has the added advantage of being scalable to use all CPU resources on the system without a GPU/CPU fusion. The algorithmic method is that the GPU MMM process may wait for a number of vectors equal to the number of systems being solved, and then it may perform a matrix-matrix product on all of them simultaneously. It should be noted, however, that there is still downtime when solving a number of systems that is much greater than the number of CPUs—essentially the threads that produce their vectors quickly may need to wait for threads that produce their vectors more slowly.

The implementation of FIG. 5E may require a significant amount of communication synchronization. Two exemplary synchronization methods that may be used include:

1) Shared queue: Each vector places a tag into a queue indicating that the vector is ready. The thread then waits for notification from the GPU thread that the work is complete, and the worker thread is free to read the result vector.

2) Atomic counter increment: When a thread produces a work vector, it performs an atomic increment of a counter. The GPU thread does a spin/sleep cycle on this variable until it equals the number of solvers, performs the computations, and then wakes each of the threads.

Figure 5F:
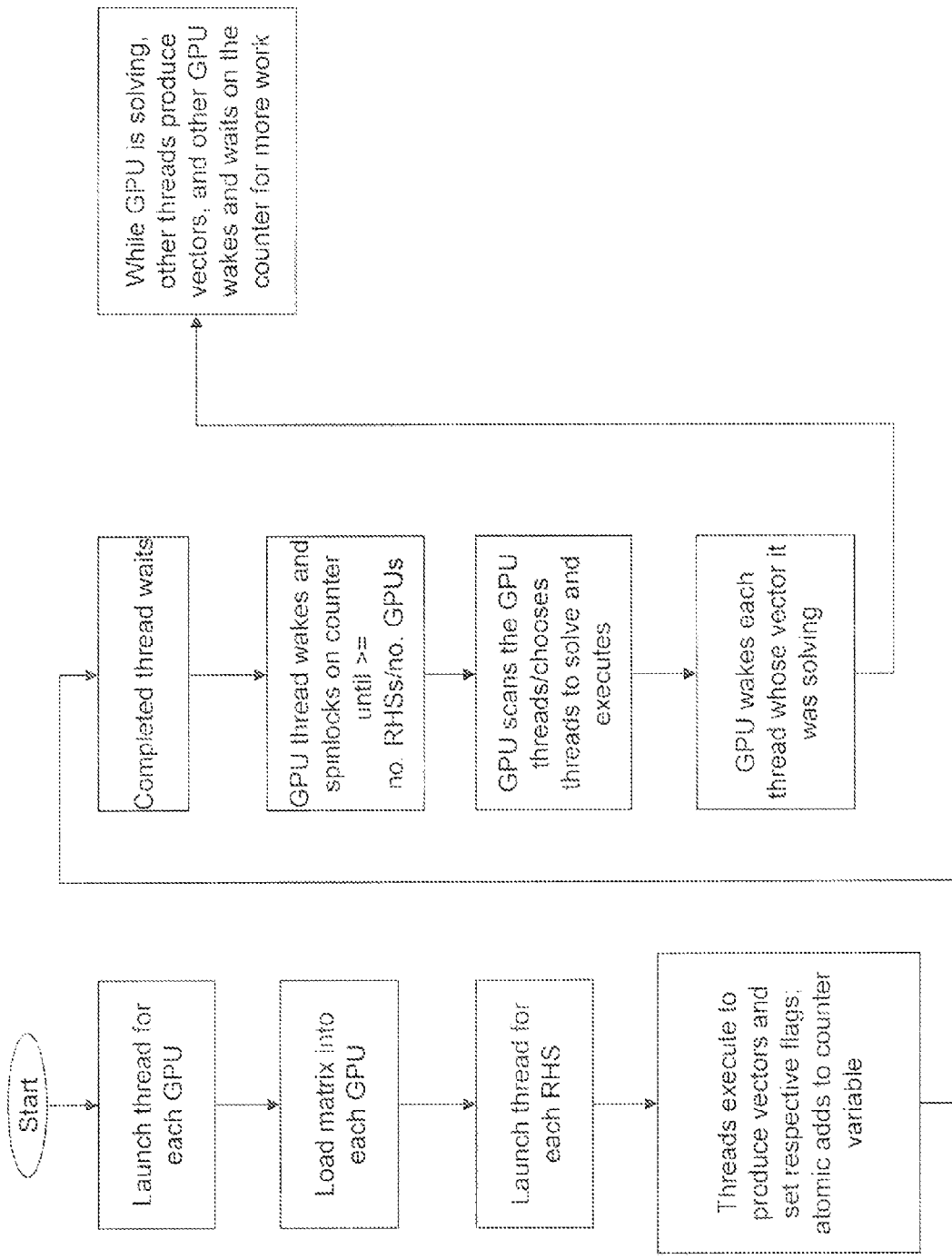

The process/system may be further improved by re-introducing the concept of multi-GPU computations, but with each GPU processing approximately half of the MVM requests. The pictorial representation becomes much more difficult, and so this is not shown in a drawing, because this system is designed for many threads running on several processors with one or more GPUs. Instead, we will present a flow outline, summarized in FIG. 5F, which may proceed as follows:

One thread is launched for each GPU
The matrix is downloaded to each GPU
One thread is launched for each RI-IS
Threads execute, and when they produce a vector, they set a flag (as on a mailbox.) An atomic add is performed on a counter variable.
The thread waits
One GPU thread wakes, and spinlocks on the counter until it is greater than or equal to the number of RHS/number of GPUs—it then scans the GPU threads, and chooses a number of them to solve. When it claims one, it clears that GPU's flag. The GPU executes—when it is finished, it awakes each thread whose vector it was solving, just as in the previous example.
While the GPU is solving, other threads continue producing vectors, and another GPU awakes and begins the wait on the counter for more work.

Additionally, the process/system may be further improved by having the GPUs cooperate, instead of competing for work. If the GPUs were to cooperate, they could split the matrix and work on the same vectors simultaneously. Ideally, performing MMM on all of the vectors simultaneously may lead to the best performance in terms of raw matrix-product FLOPS. Also, as currently stands, the matrix may need to be copied onto each card, whereas if the GPUs were to cooperate, they could split the matrix, and essentially the problem size may then to the sum of the GPU memory space.

The foregoing description illustrates and describes embodiments of the invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such or other embodiments and with the various modifications required by the particular applications or uses of the invention. Accordingly, the description is not intended to limit the invention to the form or application disclosed herein. Also, it is intended that the appended claims be construed to include alternative embodiments.

What is claimed is:

1. A thread-based computer-implemented method for performing computational electromagnetics to obtain one or more electromagnetic characteristics of a physical system, the method comprising:

partitioning, by a computing system, a coefficient matrix corresponding to a system of linear equations representing the physical system into a plurality of blocks;

loading, by the computing system, a reference row of a respective block, by a first thread row of the respective block, into shared memory;

loading, by the computing system, a pivot value of the respective block and obtaining the reciprocal of the pivot value, using a first thread of the respective block;

using a second thread, associated with a first one of the blocks, setting, by the computing system, a diagonal element of a lower-diagonal matrix of a matrix decomposition to zero;

synchronizing, by the computing system, all threads;

loading, by the first thread row of the respective block, a second value from a current column into shared memory, multiplying the second value by the reciprocal of the pivot value to obtain a third value, and storing the third value in the lower-diagonal matrix, said loading being performed by the computing system;

in the first one of the blocks, abandoning, by the computing system, one or more threads having thread IDs, where a thread ID represents a thread's association with the matrix or a block of the matrix, that are associated with positions below and/or to the left of a diagonal of the matrix or the block of the matrix;

in the first one of the blocks, performing, by the computing system, a row-operation using the threads that are not abandoned by said abandoning;

performing, by the computing system, the same row-operation in remaining blocks, where all threads are valid; and obtaining and outputting, by the computing system, at least one solution to the system of linear equations based on one or more matrices obtained, the at least one solution representing at least one electromagnetic characteristic of the physical system.

2. The method according to claim 1, wherein the matrix represents interactions among elements of the physical system.

3. The method according to claim 1, wherein results of at least some computations performed by at least some of the threads are stored in at least one permutation array, the method further comprising:

allocating a spare column of shared memory prior to executing the threads;

obtaining one or more row interchanges from a pivot array associated with the permutation array, and storing row data from the permutation array into the spare column of block memory, according to the row interchanges; and copying rows of data from the spare column of block memory back into rows of the original array that contained the permutation array, on a one-to-one basis, without row interchanges.

4. The method according to claim 1, further comprising obtaining the pivot value, said obtaining comprising:

scanning for a largest value;

interchanging a row containing the largest value with another row; and permuting any previously-processed portions of the matrix in accordance with the interchanging.

5. The method according to claim 4, wherein said scanning comprises a recursive scanning operation, comprising:

launching a sequence of sets of threads, beginning with a number of threads in a set equal to a dimension of the matrix divided by two, and successively dividing the number of threads in a set by two, until finally obtaining a set having a single thread, wherein each thread selects a greater of two entries.

6. The method according to claim 1, further comprising performing at least one row interchange, wherein the at least one row interchange is performed in parallel, with a respective thread representing a respective column.

7. The method according to claim 1, further comprising providing for download machine-executable instructions that, upon execution by one or more computing devices, result in the implementation of operations including said partitioning, said loading a reference row, said loading a pivot value, said using a second thread, said synchronizing, said loading a second value, said abandoning, said performing a row-operation, said performing the same row-operation, and said obtaining and outputting.

8. The method according to claim 1, further comprising downloading machine-executable instructions that, upon execution by one or more computing devices, result in the implementation of operations including said partitioning, said loading a reference row, said loading a pivot value, said using a second thread, said synchronizing, said loading a second value, said abandoning, said performing a row-operation, said performing the same row-operation, and said obtaining and outputting.

9. A computer-readable storage medium containing instructions stored therein that, if executed by one or more computing devices, result in the implementation of operations corresponding to a thread-based computer-implemented method for performing computational electromagnetics to obtain one or more electromagnetic characteristics of a physical system, the operations comprising:
partitioning a coefficient matrix corresponding to a system of linear equations representing the physical system into a plurality of blocks;
loading a reference row of a respective block, by a first thread row of the respective block, into shared memory;
loading a pivot value of the respective block and obtaining the reciprocal of the pivot value, using a first thread of the respective block;
using a second thread, associated with a first one of the blocks, setting a diagonal element of a lower-diagonal matrix of a matrix decomposition to zero;
synchronizing all threads;
loading, by the first thread row of the respective block, a second value from a current column into shared memory, multiplying the second value by the reciprocal of the pivot value to obtain a third value, and storing the third value in the lower-diagonal matrix;
in the first one of the blocks, abandoning one or more threads having thread IDs, where a thread ID represents a thread's association with the matrix or a block of the matrix, that are associated with positions below and/or to the left of a diagonal of the matrix or the block of the matrix;
in the first one of the blocks, performing a row-operation using the threads that are not abandoned by said abandoning;
performing the same row-operation in remaining blocks, where all threads are valid; and
obtaining and outputting it least one solution to the system of linear equations based on one or more matrices obtained, the at least one solution representing at least one electromagnetic characteristic of the physical system.

10. The medium according to claim 9, wherein the matrix represents interactions among elements of the physical system.

11. The medium according to claim 9, wherein results of at least some computations performed by at least some of the threads are stored in at least one permutation array, the operations further comprising:
allocating a spare column of shared memory prior to executing the threads;
obtaining one or more row interchanges from a pivot array associated with the permutation array, and storing row data from the permutation array into the spare column of block memory, according to the row interchanges; and
copying rows of data from the spare column of block memory back into rows of the original array that contained the permutation array, on a one-to-one basis, without row interchanges.

12. The medium according to claim 9, wherein the operations further comprise obtaining the pivot value, said obtaining comprising:
scanning for a largest value;
interchanging a row containing the largest value with another row; and
permuting any previously-processed portions of the matrix in accordance with the interchanging.

13. The medium according to claim 12, wherein said scanning comprises a recursive seaming operation, comprising:
launching a sequence of sets of threads, beginning with a number of threads in a set equal to a dimension of the matrix divided by two, and successively dividing the number of threads in a set by two, until finally obtaining a set having a single thread, wherein each thread selects a greater of two entries.

14. The medium according to claim 9, further comprising performing at least one row interchange, wherein the at least one row interchange is performed in parallel, with a respective thread representing a respective column.

15. A method for iteratively solving a system of linear equations, the method comprising:
using one or more graphics processing units (GPUs) to perform respective matrix-vector-matrix multiplication (MVM) operations to obtain one or more respective intermediate solutions;
using one or more central processing units (CPUs) to determine whether the respective intermediate solutions have converged to within a predetermined tolerance; and
controlling, by the one or more CPUs, respective GPUs corresponding to intermediate solutions that have not converged to within the predetermined tolerance to obtain further respective intermediate solutions.

16. The method according to claim 15, wherein using one or more CPUs comprises sharing a single CPU among multiple GPUs.

17. The method according to claim 15, wherein each CPU is associated with a respective GPU.

18. The method according to claim 15, wherein using one or more GPUs comprises using multiple GPUs in parallel.

19. The method according to claim 15, wherein using one or more GPUs comprises using multiple GPUs to perform matrix-matrix multiplications, wherein the multiple GPUs are shared by two or more CPUs to obtain two or more intermediate solutions.

20. The method according to claim 15, wherein using one or more GPUs comprises:
generating a thread for each respective GPU;
loading the matrix corresponding to the system of linear equations into each respective GPU;

generating a thread corresponding to a respective case to be solved for the system of linear equations;

executing a thread on a respective GPU, and when the executing is complete, setting a flag and adding to a counter variable; and executing a GPU thread corresponding to an idle GPU to obtain at least one further thread corresponding to a respective case to execute.

21. The method according to claim 15, wherein using one or more GPUs comprises:

splitting up the matrix corresponding the system of linear equations among the GPUs; and executing a portion of a respective case for which a solution is to be obtained for the system of linear equations on each of the GPUs.

22. The method according to claim 15, further comprising providing for download machine-executable instructions that, upon execution by one or more computing devices, result in the implementation of operations including said using one or more GPUs, said using one or more CPUs, and said controlling.

23. The method according to claim 15, further comprising downloading machine-executable instructions that, upon execution by one or more computing devices, result in the implementation of operations including said using one or more GPUs, said using one or more CPUs, and said controlling.

24. An apparatus for iteratively solving a system of linear equations, the apparatus comprising:

one or more graphics processing units (GPUs) configured to perform respective matrix-vector-matrix multiplication (MVM) operations to obtain one or more respective intermediate solutions;

one or more central processing units (CPUs) configured to determine whether the respective intermediate solutions have converged to within a predetermined tolerance; and wherein the one or more CPUs are further configured to control respective GPUs corresponding to intermediate solutions that have not converged to within the predetermined tolerance to obtain further respective intermediate solutions.

25. The apparatus according to claim 24, wherein a single CPU is configured to be shared among multiple GPUs.

26. The apparatus according to claim 24, wherein each CPU is associated with a respective GPU.

27. The apparatus according to claim 24, wherein the one or more GPUs comprise multiple GPUs configured to operate in parallel.

28. The apparatus according to claim 24, wherein the one or more GPUs comprise multiple GPUs configured to perform matrix-matrix multiplications, wherein the multiple GPUs are configured to be shared by two or more CPUs to obtain two or more intermediate solutions.

29. The apparatus according to claim 24, wherein the apparatus is configured to:

generate a thread for each respective GPU;

load the matrix corresponding to the system of linear equations into each respective GPU;

generate a thread corresponding to a respective case to be solved for the system of linear equations;

execute a thread on a respective GPU, and when the executing is complete, set a flag and add to a counter variable; and execute a GPU thread corresponding to an idle GPU to obtain at least one further thread corresponding to a respective case to execute.

30. The apparatus according to claim 24, wherein the apparatus is configured to:

split up the matrix corresponding the system of linear equations among the GPUs; and execute a portion of a respective case for which a solution is to be obtained for the system of linear equations on each of the GPUs.

31. A computer-readable storage medium containing instructions stored therein that, if executed by one or more computing devices, result in the implementation of operations corresponding to a method for iteratively solving a system of linear equations, the operations comprising:

using one or more graphics processing units (GPUs) to perform respective matrix-vector-matrix multiplication (MVM) operations to obtain one or more respective intermediate solutions;

using one or more central processing units (CPUs) to determine whether the respective intermediate solutions have converged to within a predetermined tolerance; and controlling, by the one or more CPUs, respective GPUs corresponding to intermediate solutions that have not converged to within the predetermined tolerance to obtain further respective intermediate solutions.

32. The medium according to claim 31, wherein using one or more CPUs comprises sharing a single CPU among multiple GPUs.

33. The medium according to claim 31, wherein each CPU is associated with a respective GPU.

34. The medium according to claim 31, wherein using one or more GPUs comprises using multiple GPUs in parallel.

35. The medium according to claim 31, wherein using one or more GPUs comprises using multiple GPUs to perform matrix-matrix multiplications, wherein the multiple GPUs are shared by two or more CPUs to obtain two or more intermediate solutions.

36. The medium according to claim 31, wherein using one or more GPUs comprises:

generating a thread for each respective GPU;

loading the matrix corresponding to the system of linear equations into each respective GPU;

generating a thread corresponding to a respective case to be solved for the system of linear equations;

executing a thread on a respective GPU, and when the executing is complete, setting a flag and adding to a counter variable; and executing a GPU thread corresponding to an idle GPU to obtain at least one further thread corresponding to a respective case to execute.

37. The medium according to claim 31, wherein using one or more GPUs comprises:

splitting up the matrix corresponding the system of linear equations among the GPUs; and executing a portion of a respective case for which a solution is to be obtained for the system of linear equations on each of the GPUs.

* * * * *